US011067410B2

(12) United States Patent
Lee

(10) Patent No.: US 11,067,410 B2
(45) Date of Patent: Jul. 20, 2021

(54) FIRST-PERSON PERSPECTIVE VIEW

(71) Applicant: Uber Technologies, Inc., San Francisco, CA (US)

(72) Inventor: Seung Woo Lee, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 565 days.

(21) Appl. No.: 15/698,550

(22) Filed: Sep. 7, 2017

(65) Prior Publication Data

US 2019/0072408 A1  Mar. 7, 2019

(51) Int. Cl.
G01C 21/36 (2006.01)
G06K 9/00 (2006.01)
G06T 11/60 (2006.01)
H04N 5/232 (2006.01)
H04L 29/08 (2006.01)
G01C 21/34 (2006.01)

(52) U.S. Cl.
CPC ..... *G01C 21/3647* (2013.01); *G01C 21/3438* (2013.01); *G01C 21/362* (2013.01); *G01C 21/3614* (2013.01); *G01C 21/3655* (2013.01); *G01C 21/3661* (2013.01); *G01C 21/3676* (2013.01); *G06K 9/00671* (2013.01); *G06T 11/60* (2013.01); *H04L 67/18* (2013.01); *H04L 67/22* (2013.01); *H04N 5/23238* (2013.01); *H04N 5/232939* (2018.08)

(58) Field of Classification Search
None
See application file for complete search history.

(56) References Cited

U.S. PATENT DOCUMENTS

| 8,483,715 | B2 | 7/2013 | Chen | |
| 10,809,081 | B1 * | 10/2020 | Kentley-Klay | G08G 1/017 |
| 2010/0250113 | A1 * | 9/2010 | Miyata | G01C 21/3635 |
| | | | | 701/533 |
| 2011/0141141 | A1 * | 6/2011 | Kankainen | H04N 5/23216 |
| | | | | 345/632 |
| 2014/0100995 | A1 | 4/2014 | Koshy et al. | |
| 2014/0172640 | A1 | 6/2014 | Argue et al. | |
| 2014/0207373 | A1 | 7/2014 | Lerenc | |

(Continued)

FOREIGN PATENT DOCUMENTS

| DE | 102006034413 A1 | 1/2008 |
| WO | WO 2011/069170 A1 | 6/2011 |

OTHER PUBLICATIONS

PCT International Search Report and Written Opinion, PCT Application No. PCT/IB2018/056689, dated Dec. 26, 2018, 14 pages.

(Continued)

*Primary Examiner* — Nicholas K Wiltey
(74) *Attorney, Agent, or Firm* — Fenwick & West LLP

(57) ABSTRACT

The disclosure provides a method for communicating a meeting point to a provider traveling along a route to meet a user at a destination. Near the destination specified for the route, the user may specify a meeting point, a point at which the user will be waiting for the provider. The meeting point may be different or the same as the destination. The meeting point is then communicated to the provider to help the provider find the user, upon approach to the destination.

21 Claims, 7 Drawing Sheets

(56) References Cited

U.S. PATENT DOCUMENTS

| | | | |
|---|---|---|---|
| 2016/0138928 A1 | 5/2016 | Guo et al. | |
| 2017/0059347 A1* | 3/2017 | Flier | G06Q 10/08355 |
| 2017/0103571 A1 | 4/2017 | Beaurepaire | |
| 2017/0115125 A1 | 4/2017 | Outwater et al. | |
| 2017/0243403 A1 | 8/2017 | Daniels et al. | |
| 2017/0343375 A1 | 11/2017 | Kamhi et al. | |
| 2018/0058863 A1* | 3/2018 | Meyer | G01C 21/3415 |
| 2018/0188731 A1* | 7/2018 | Matthiesen | G06Q 10/02 |
| 2018/0357907 A1* | 12/2018 | Reiley | H04W 4/023 |
| 2019/0017839 A1* | 1/2019 | Eyler | G02B 27/0101 |

OTHER PUBLICATIONS

U.S. Appl. No. 16/712,824, filed Dec. 12, 2019, Inventor Aaron Matthew Rogan (copy not enclosed).
European Patent Office, Extended European Search Report and Opinion, EP Patent Application No. 18854606.3, dated Apr. 23, 2021, ten pages.

* cited by examiner

FIRST-PERSON PERSPECTIVE VIEW

BACKGROUND

The current disclosure relates to coordinating a mutual meeting location and specifically to providing guidance for a provider to rendezvous with a user based on captured images of an area.

Since providers may be in vehicles that travel along limited pathways (e.g., roads) and users may be limited to another set of limited pathways (e.g., sidewalks and crosswalks), it may be difficult for the provider to find the user. Furthermore, if the provider has never met or seen the user, the problem of finding the user becomes more difficult, especially in crowded areas.

SUMMARY

The disclosure provides a method for communicating a meeting point to a provider traveling along a route to meet a user at a destination. Near the destination specified for the route, the user may specify a meeting point at which the user will be waiting for the provider. This helps the provider find the user when the provider approaches the destination.

The provider may initiate a route to a meeting with the user after a user requests a service of the provider. The provider may be matched with the user and initiate a route to a destination specified by the user. When a route is identified for a provider by a rendezvous coordination system, the route to the destination is sent to a client device of the provider. A separate route to the destination for the user may be sent to the client device of the user. The routes, along with respective navigation information, may be displayed to the provider and user via their respective client devices.

As the provider and user travel along their routes to the destination, the locations of their client devices are monitored. To assist in providing a meeting between the provider and user, the rendezvous coordination system may access images of geographic locations as captured by other cars or vehicles traveling along the route. A location from which an image is taken is termed a capture point. The rendezvous coordination system may identify one or more capture points at or near the destination and images associated with the capture points.

An image of a location from a perspective of the capture point is termed a view. The image may show the environment around the capture point. Furthermore, a view may be associated with its capture point.

Once the user is near the destination, the user's client device prompts the user to designate a meeting point. The meeting point is a discrete point where the provider can expect to find the user at or near the destination. The user may designate a meeting point by placing a marker in a view associated with the capture point identified by the rendezvous coordination system. In one embodiment, the user may designate a meeting point in a view captured from his or her client device.

Once the meeting point is designated by the user, the user's client device may send the marker in the view to the provider's client device or the rendezvous coordination system which may later send the marker in the view to the provider's client device.

Once the provider's client device is within a threshold distance of the capture point or destination, the client device displays the marker in the view. This assists the provider to find the user by showing the expected location of the user (the meeting point) in the view of the environment.

DETAILED DESCRIPTION

Figure 1:
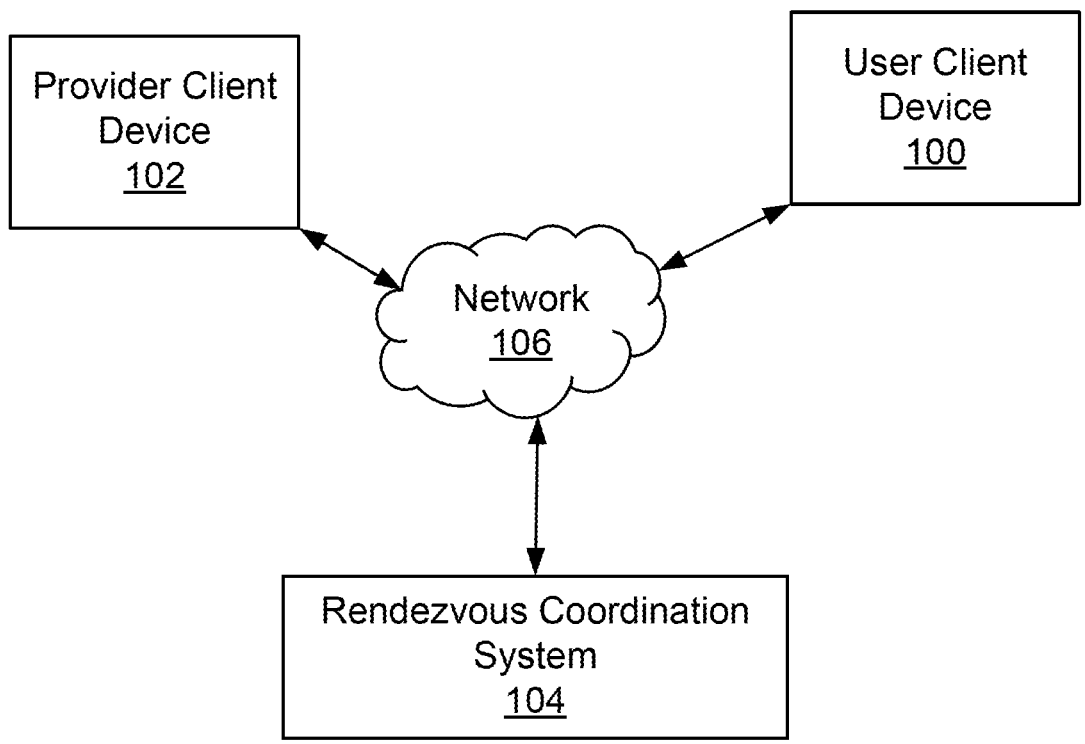
FIG. 1 is a block diagram illustrating the system environment for a rendezvous coordination system according to one embodiment.

FIG. 1 is a block diagram illustrating the system environment for a rendezvous coordination system according to one embodiment. The system environment includes a user client device 100, provider client device 102, rendezvous coordination system 104, and a network 106. In alternative configurations, different and/or additional modules may be included in the system environment.

The user client device 100 and provider client device 102 allow a user and provider to communicate and interact via the network 106 with the rendezvous coordination system 104. Specifically, the client devices 100, 102 transmit and receive data from the rendezvous coordination system 104 relating to communicating a meeting point between a user and a provider. The data may be route information, location information, and images. The client devices 100, 102 are computing systems capable of receiving end user input as well as transmitting and receiving data via the network 106. The client devices 100, 102 may contain location sensors that detect the geographical location of the device, such as a global positioning system (GPS). The client devices 100, 102 may also run applications that allow the client devices 100, 102 to specifically communicate with the rendezvous coordination system 104. Examples of client devices 100, 102 include desktops, laptops, smartphones, and tablets.

The rendezvous coordination system 104 is a system that communicates with the client devices 100, 102, via the network 106, to coordinate or otherwise provide services relating to navigating to a destination and communicating a meeting point. For example, the rendezvous coordination system 104 may determine a destination for rendezvous, monitor the location of the client devices 100, 102, determine routes to the destination, identify capture points containing images depicting views of an environment, and overlay markers onto the views. In an alternate embodiment, the rendezvous coordination system 104 may not exist or its functionality may be incorporated in the client devices 100, 102.

Figure 2:
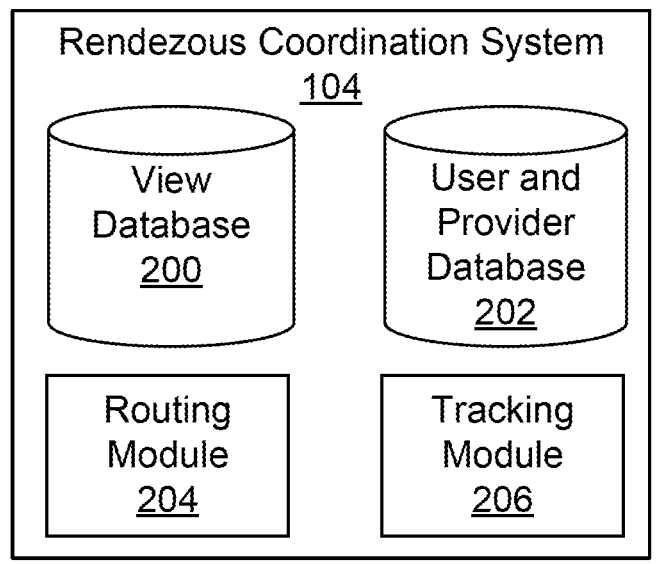
FIG. 2 is a block diagram illustrating the modules of the rendezvous coordination system, according to one embodiment.

FIG. 2 is a block diagram illustrating the modules of the rendezvous coordination system 104, according to one embodiment. The rendezvous coordination system 104 includes a view database 200, user and provider database 202, routing module 204, and tracking module 206.

The view database 200 stores an organized collection of images that are accessible by the rendezvous coordination system 104. The images in the view database 200 are used to select views. The images in the view database 200 generally depict images of an environment from a street or end user perspective. For example, the images may be "street view" images or images taken by a user from an image capture device, such as a client device. Furthermore the images may be panoramic images, such as equirectangular, cubemap, spherical, or cylindrical images representing a large field of view, and may represent a field of view for a complete 360' perspective. Each image is associated with the physical location it was captured from. This location is referred to as a capture point. A capture point may be associated with a plurality of images or a single image from the view database 200.

Figure 5A:
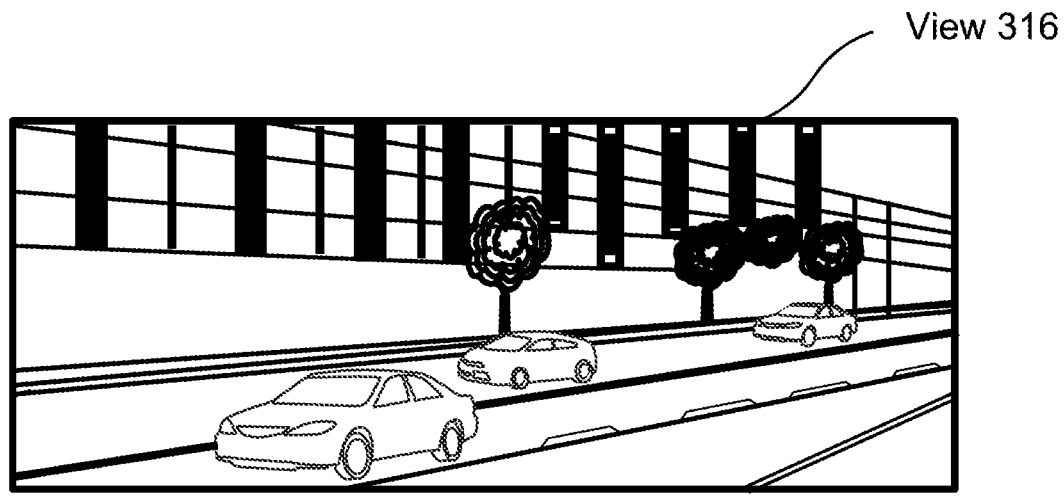
FIG. 5A is an illustration of a view from a capture point, according to one embodiment.

Recall that an image of a location from a perspective of the capture point is termed a view (see FIG. 5A, for example). As a result, an image in the view database 200 may be a view or a view may be selected from an image in the view database 200 (e.g. by a user or the rendezvous coordination system 104). For example, a view may be a portion of a panoramic image of the environment.

The user and provider database 202 stores a collection of user and provider profiles. The profiles include information associated with each user and provider. For example, for each user and provider, the user and provider database 202 may contain a picture, ratings, a home address, basic information (e.g., name and age), and demographic information (e.g., gender and race).

The routing module 204 calculates routes for users and providers to travel from one geographical location to another to allow a user and provider to arrive at a mutual destination. The destination is a location that is reachable by both the user and provider and used to route the user and provider to meet. As discussed below, the actual point at which the user and provider meet may differ and be assisted by the designation of a meeting point in a view. For example, given a user location and a provider location, the routing module 204 may determine a destination, a user route to the destination, and a provider route to the destination. To do this, the routing module 204 may contain a map information, and traffic pattern information. The routing module 204 may also be capable of updating routes in real time. For example, if a provider turns left instead of right at an intersection, the routing module 204 may update the provider route in real time. The routing module 204 may also account for user and provider vehicle types. For example, the routing module 204 may calculate a different destination, route, or both for a user who is walking compared to a user who is riding a bike.

The tracking module 206 tracks the client devices of the user and provider as they travel to the destination. This may be done by receiving location information updates periodically. As the user and provider travel to the destination, the tracking module 206 may send content or instructions to their respective client devices. For example, when the user is near or at the destination the tracking module 206 may send a view associated with a capture point near or at the destination.

Figure 3:
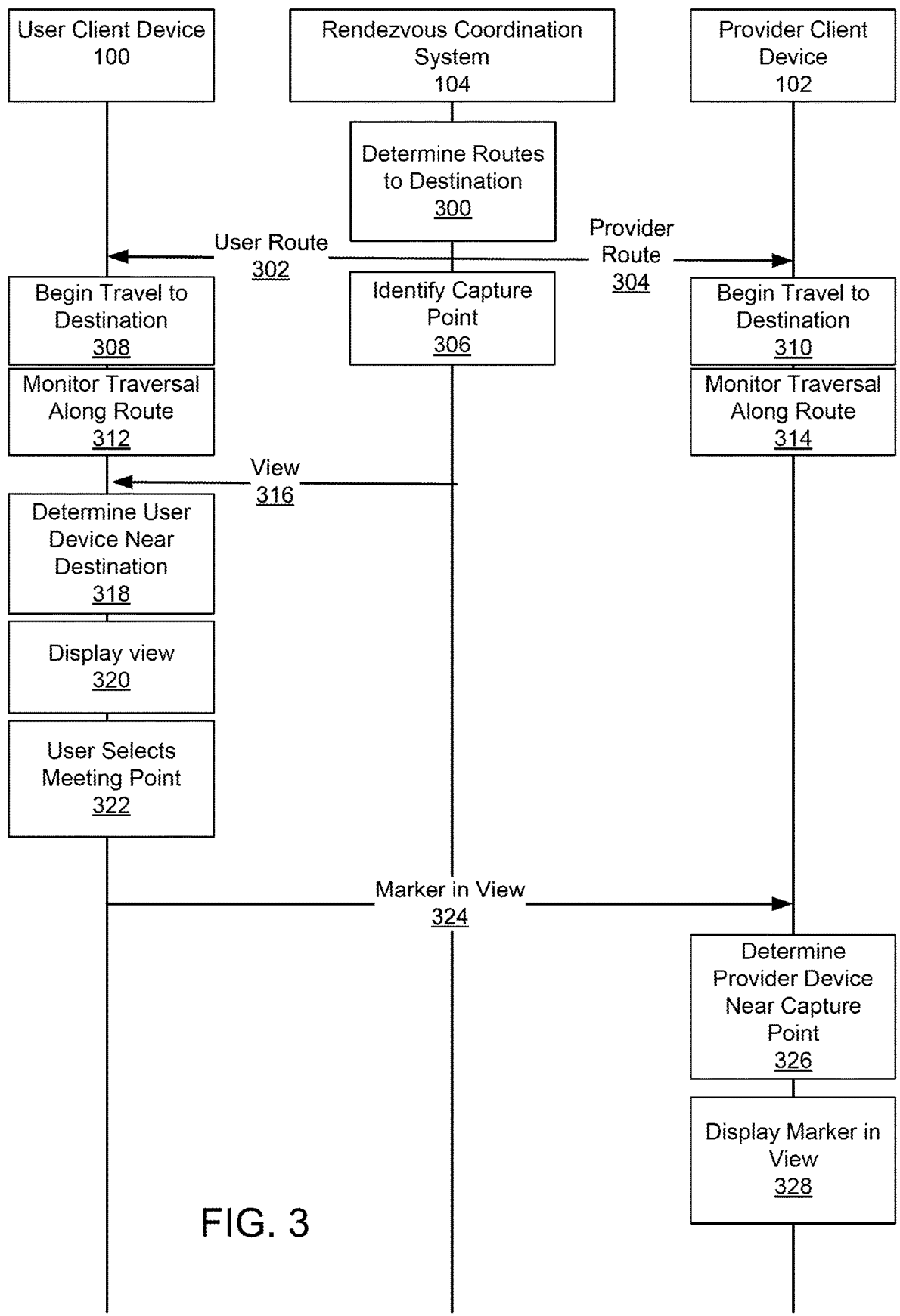
FIG. 3 is an interaction diagram illustrating the rendezvous coordination system coordinating a meeting point between a user client device and a provider client device.

FIG. 3 is an interaction diagram illustrating the rendezvous coordination system 104 coordinating a meeting point between a user client device 100 and a provider client device 102. After the rendezvous coordination system 104 has matched a user client device 100 and provider client device 102, determined their respective locations, and determined a destination, the rendezvous coordination system 104 may determine 300 routes to the destination. Specifically, the rendezvous coordination system 104 may calculate a route for the user to travel from the user client device's 100 current location to the destination and a route for the provider to travel from the provider client device's 102 current location to the destination. Alternatively, the route determination 300 may be done by each client device 100, 102, instead of the rendezvous coordination system 104.

After determining 300 routes to the destination, the rendezvous coordination system 104 sends the user route 302 to the user client device 100 and the provider route 304 to the provider client device 102. The routes 302, 304, along with respective navigation information may be displayed to the provider and user via their respective client devices 100, 102.

The rendezvous coordination system 104 may also identify 306 a capture point near the destination that allows a user to designate a meeting point in a view 316 (described below) from the capture point. The rendezvous coordination system 104 may identify a capture point based upon its distance (e.g., Euclidean distance) to the destination. The rendezvous coordination system 104 may further only consider capture points along the route of the provider or user. Alternatively, instead of considering distance from the destination, the rendezvous coordination system 104 may identify a capture point by considering distance from the location of the user client device 100. If the rendezvous coordination system 104 does not identify any capture points near the destination (e.g., within a threshold distance) or user client device 100, the rendezvous coordination system 104 may prompt the user create to create a capture point by taking an image from an image capture device, such as a client device. In another embodiment, the rendezvous coordination system 104 may identify several capture points. This may be done before, after, or at the same time that the rendezvous coordination system 104 determines 300 routes to the destination. For each capture point identified 306 by the rendezvous coordination system 104, the rendezvous coordination system 104 selects at least one image from the view database 200 associated to each capture point that may be used to designate a meeting point.

Once the user client device 100 receives the user route 302, the user may begin to travel 308 to the destination along the user route 302. Similarly, the provider may begin to travel 310 along the provider route 314 to the destination after the provider client device 102 receives the provider route 304.

The user client device 100 may monitor 312 the location of the user client device 100 as it travels along the route. This may also be done by the rendezvous coordination system 104. As the user client device 100 travels 312 along the route to the destination, the user client device 100 may display navigation information to guide the user along the user route 302. An example user client device 100 displaying navigation information may be seen in FIG. 4A. Similarly, the provider client device 102 may monitor 314 the location of the provider client device 100 as it travels along the route and display navigation information to the provider.

After the rendezvous coordination system 104 identities 306 a capture point, it may send a view 316 or image from the view database 200, associated with the capture point identified by the rendezvous coordination system 104, to the user client device 100. The view 316 is an image from a perspective of the capture point. When the rendezvous coordination system 104 identifies several capture points, it may send multiple views 316 to the user client device 100, one for each capture point. An example of a view 316 may be seen in FIG. 5A.

As the user client device 100 travels along the user route 302, the user client device 100 may determine 318 that the user client device 100 is near the destination. This may occur when the user client device 100 is within a threshold distance from the destination. Alternatively, the user client device 100 may determine 318 that the user client device 100 is near the capture point identified 306 by the rendezvous coordination system 104, instead of the destination. The distance from the capture point or destination may be absolute distance (e.g., Euclidean distance) or it may be distance from the capture point or destination along the route 302, 304.

Once the user client device 100 has received the view 316 and determined 318 that the user client device 100 is near the destination or a capture point of the view, the user client device 100 may display 320 the view 316 to the user. This allows the user to see the view 316 and select a meeting point that may be represented in the view 316. Alternatively, the user may first have the option to select a view 316 in an image displayed to the user before selecting the meeting point. For example, the user may select a view 316 in a panoramic image. An example of a user client device 100 displaying 320 a view 316 may be seen in FIG. 4B. An example of a view 316 may be seen in FIG. 5A.

Once the view 316 is displayed 320 by the user client device 100, the user may select 322 a meeting point. The meeting point may be selected by the user placing a marker in the view 316 to represent the meeting point. An example of a marker placed in a view 316 may be seen in FIG. 5B.

After the user selects 322 a meeting point by placing the marker in the view 316, the marker in the view 324 is sent to the provider client device 102. Alternatively, this may be done by the user client device 100 sending the marker in the view 324 to the rendezvous coordination system 104, first, and then the rendezvous coordination system 104 sending the marker in the view 324 to the provider client device 102.

The provider client device 102 determines 326 that the provider client device 102 is near the capture point. This may occur when the capture point is within a threshold distance from the capture point. Alternatively, the provider client device 102 may determine 326 that the provider client device 102 is near the destination, instead of the capture point. The distance from the capture point or destination may be absolute distance (e.g., Euclidean distance) or it may be distance from the capture point or destination along the route 302, 304. An example of a provider approaching a capture point may be seen in FIG. 6.

Once the provider client device 102 has determined 326 that the provider client device 102 is near the capture point, the provider client device 102 may display 328 the marker in the view 324 to the provider. This allows the provider to infer the location of the meeting point as represented by the marker in the view 324. An example of a marker in a view that may be displayed to a provider may be seen in FIG. 5B.

Figure 4A:
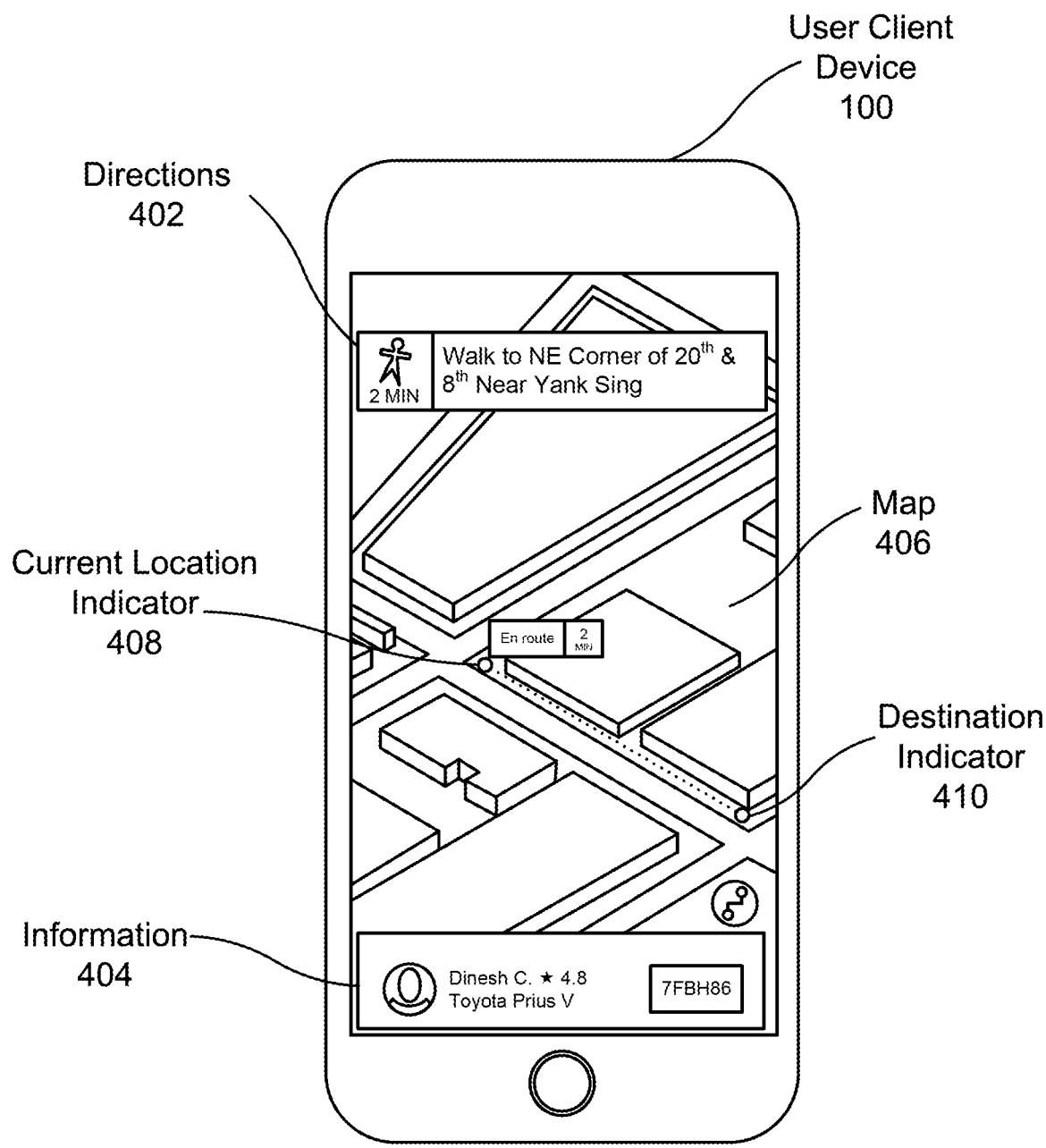
FIG. 4A is an illustration of a user client device displaying route information to a destination, according to one embodiment.

FIG. 4A is an illustration of a user client device 100 displaying route information to a destination, according to one embodiment. The user client device 100 may display directions 402, information 404, and a map 406 which may include a current location indicator 408 of the user client device 100 and a destination indicator 410. The provider client device 102 may display similar things to the provider.

The user client device 100 may be used by the user to interact with the rendezvous coordination system 104. For example, the user may use the user client device 100, or the user client device 100 may assist the user, to request a provider, chose a provider, find the current location of the user client device 100, navigate to the destination via the map 406 and directions 402, view information 404 about a provider, and select a meeting point.

The directions 402 guide the user along his or her respective route as the user travels from the user's current location (represented by the current location indicator 408) to the destination (represented by the destination indicator 410). The directions 402 may also estimate the time until the user arrives at the destination. The directions 402 may be displayed via text or audibly emitted by the user client device 100, or may be communicated via haptic feedback by the user client device 100 (e.g., with different types or sequences of vibrations corresponding to different navigation instructions like left and right turns). The displayed directions 402 may be a subset of instructions that change as the user travels or all instructions necessary to guide the user to the destination indicator 410. The directions 402 may guide the user along pathways suitable for the user. For example, if the user is walking, the pathways may be sidewalks and walkways. Similarly, if the user is riding a bike, the pathways may be roads and bike paths.

The information 404 provides information to the user that will be useful to identify the provider. This may include a name of the provider, picture of the provider, picture of the vehicle, vehicle type, vehicle color, ratings, and license plate number. This information 404 may come from the user and provider database 202.

The map 406 is a map that includes the route and surrounding environment from the user's current location indicator 408 to the destination indicator 410. Alternatively, the map 406 may only display the current location indicator 408 or destination indicator 410. For example, the map 406 may only provide the route and surrounding environment related to the subset of displayed directions 402.

The current location indicator 408 is a representation of the geographical location of the user client device 100 on the map 406. This may be tracked using the location information capabilities of the user client device 100. The current location indicator 408 may also be monitored by the rendezvous coordination system 104. The map also includes a destination indicator 410 that represents the geographical location of the destination on the map 406.

Figure 4B:
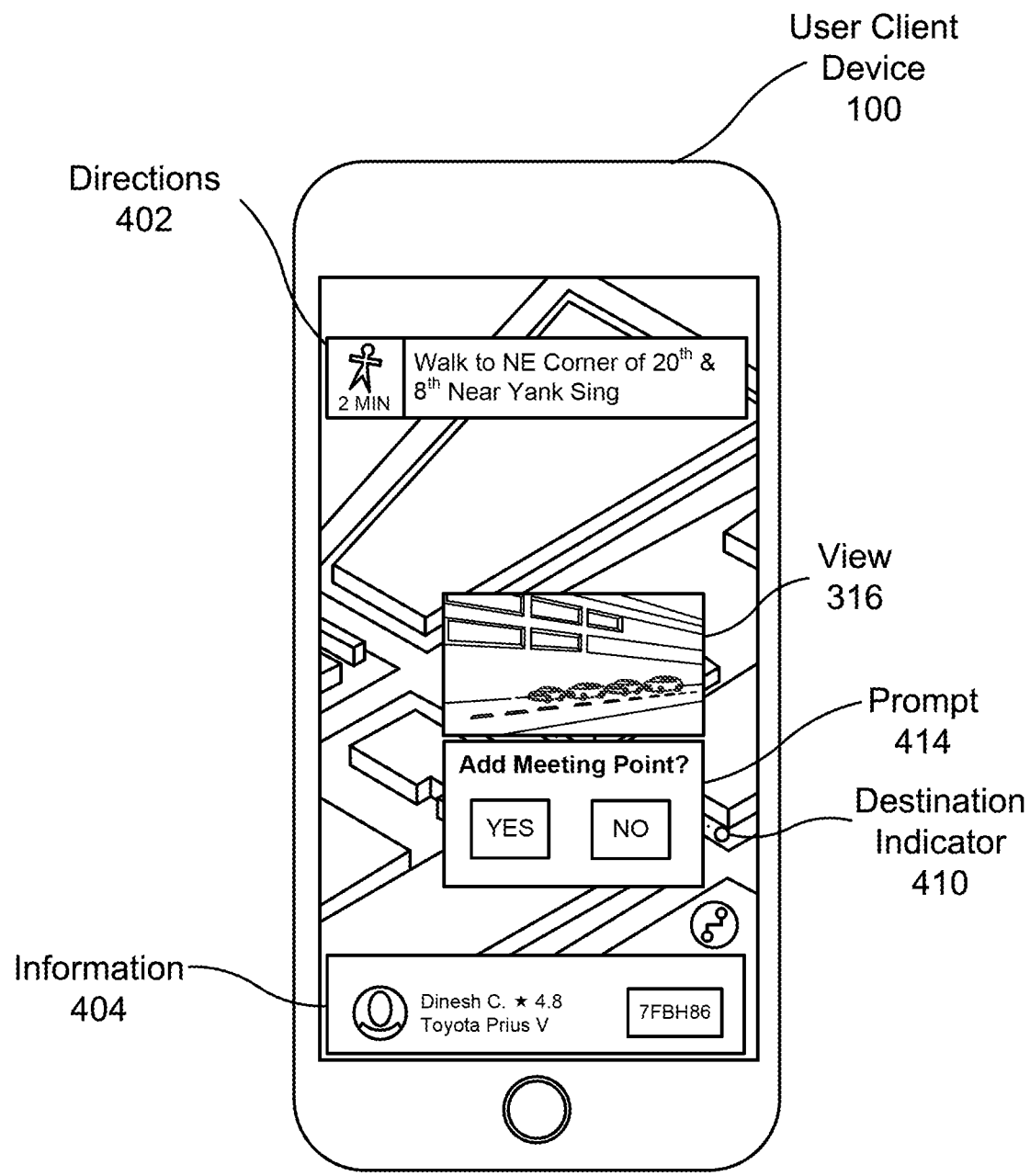
FIG. 4B is an illustration of a user client device overlaying a view and prompt on top of the route information seen in FIG. 4A, according to one embodiment.

FIG. 4B is an illustration of a user client device 100 overlaying a view 316 and prompt 414 on top of the route information seen in FIG. 4A, according to one embodiment. Specifically, the view 316 and prompt 414 may be displayed once the current location indicator 408 is near the destination indicator 410. An alternate embodiment may allow the view 316 and prompt 314 to be displayed to the provider (e.g., if the provider arrives to the destination indicator 410 before the user).

The view 316 is an image from the view database 200 and is associated with a capture point selected by the rendezvous coordination system 104. The prompt 414 may be text associated with the view 316. The view 316 and prompt 414 allow the user to communicate with the rendezvous coordination system 104 concerning the meeting point. For example, the prompt 414 may ask the user if he or she would like to designate a meeting point, and the view 316 may be an image on which the user may place the marker. In an alternate embodiment, the prompt 414 may ask the user to select one of a plurality of capture points, and the view 316 may be several images, one for each of the plurality of capture points.

FIG. 5A is an illustration of a view 316 from a capture point, according to one embodiment. When the user elects to select a meeting point, the view 316 may be enlarged on the user client device 100 to allow the user to better see the view 316. If more than one view 316 is associated with the selected capture point, the user may have the option to select the view 316 deemed most appropriate by the user. For example, when the view is a portion of a panoramic image, the user may pan or zoom within the image to designate a particular view of the image in which to mark the meeting point.

Figure 5B:
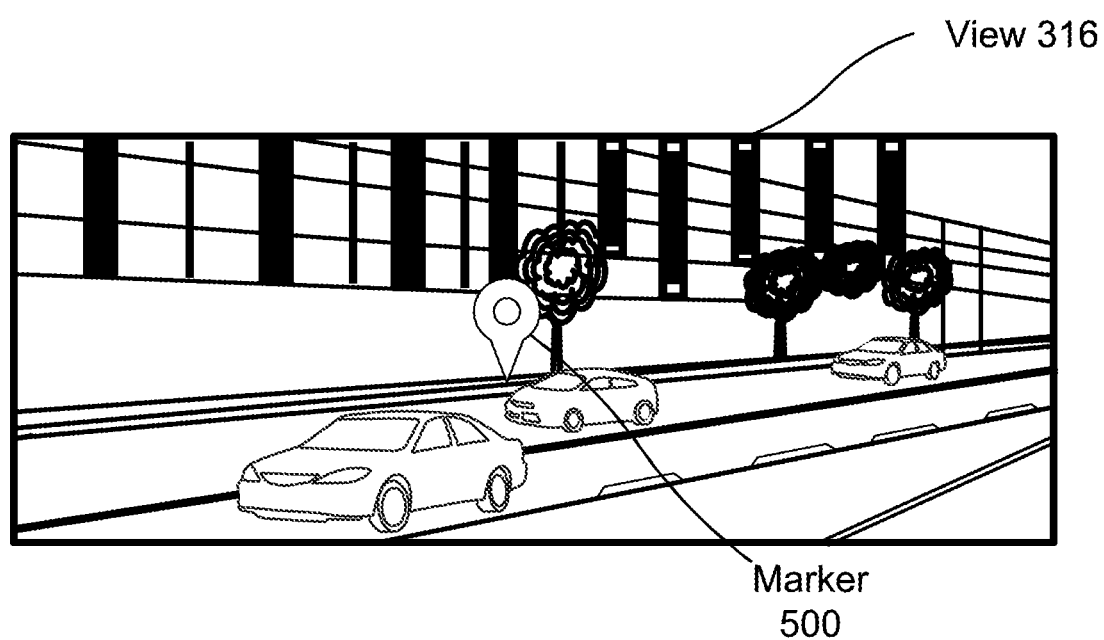
FIG. 5B is an illustration of the view from a capture point with an overlaid marker, according to one embodiment.

FIG. 5B is an illustration of a view 316 with an overlaid marker 500, according to one embodiment. The overlaid marker 500 may be placed by the user to represent the location of the user from the perspective of the capture point. This is a representation of the meeting point. FIG. 5B is an example of the marker in the view 324 that is sent to the provider client device 102. Shown to the provider, the meeting point helps the provider find the user upon approach to the destination.

Figure 6:
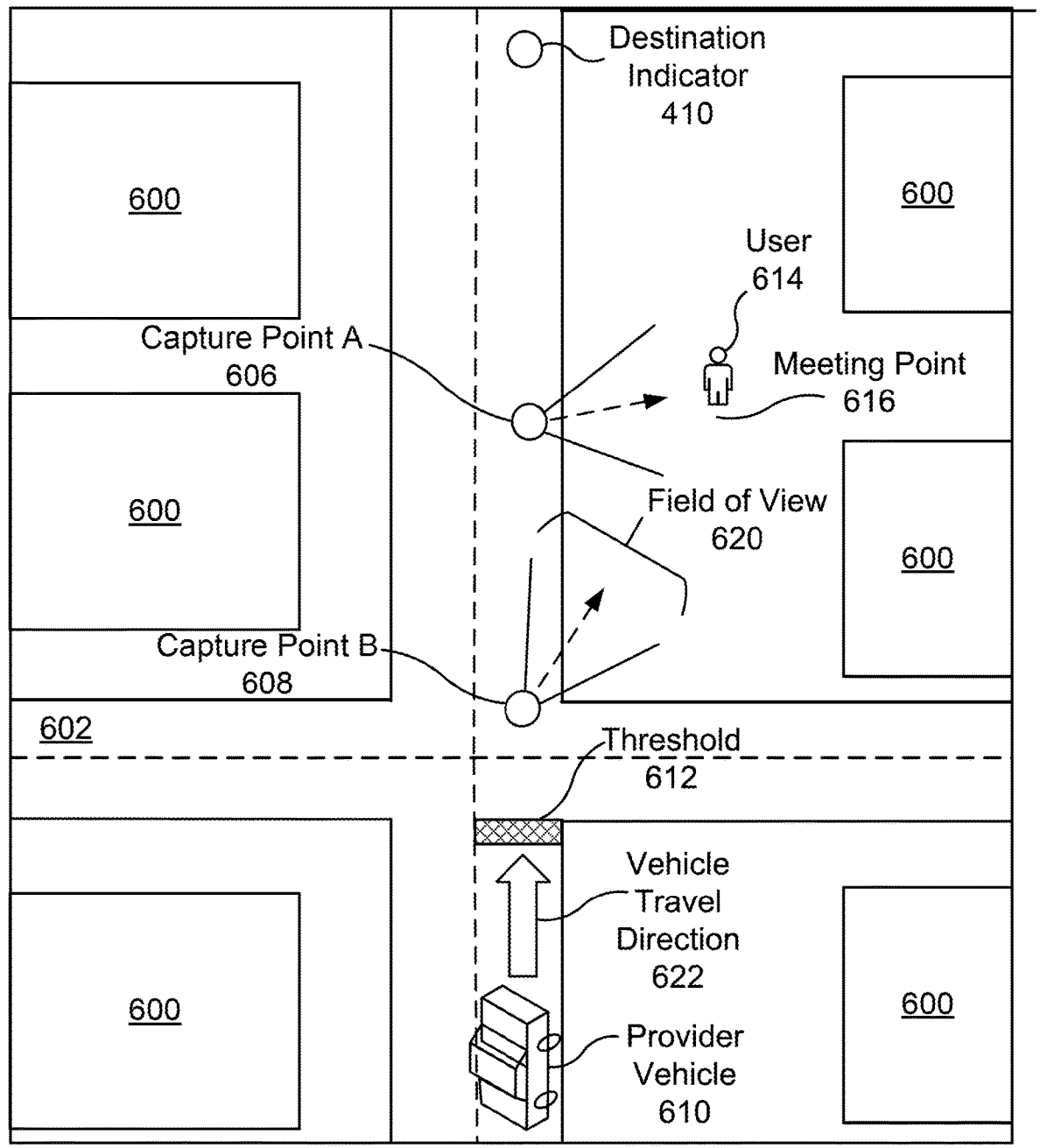
FIG. 6 is an example illustration of provider approaching a capture point, according to one embodiment.

FIG. 6 is an example illustration of provider approaching a capture point, according to one embodiment. The illustration includes a user 614 who is waiting to be picked up by a provider vehicle 610, buildings 600, road 602, capture point A 606, capture point B 608, a threshold 612, meeting point 616, field of view 620, and vehicle travel direction 622. The situation has been coordinated by the rendezvous coordination system 104 through client devices 100, 102.

The buildings 600 are obstacles that limit the provider vehicle 610 to travel along the road 602. The buildings 600 may be buildings, structures, playgrounds, or people. The road 602 is a pathway that the provider vehicle 610 uses to travel to the destination. The road 602 may be a street, road, or highway.

The capture point A 606 and capture point B 608 are capture points as defined with reference to FIG. 1 and FIG. 2. Images from one or both of the capture points 606, 608 may be selected as views 316.

The provider vehicle 610 is a vehicle that the provider uses to travel to the destination indicator 410. Generally, the provider vehicle may be anything used for transporting people or goods, such as cars, bikes, or boats. For the embodiment of FIG. 6, the provider vehicle 610 is traveling towards the destination indicator 414 and is a vehicle which has the capabilities to travel along the road 602, such as a car or bike. In the embodiment of FIG. 6, the provider and provider client device 102 are inside of the provider vehicle 610.

The vehicle travel direction 622 is the direction that the provider vehicle 610 travels to in order to arrive at the destination indicator 410 or meeting point 616.

Once the provider client device 102 crosses the threshold 612, the provider client device 102 may display the marker in the view 324. The threshold 612 may be set by the rendezvous coordination system 104 and may mark a threshold distance from a capture point 606, 608 or destination indicator 410.

The user 614 is a user who has traveled to the destination, has specified a meeting point 616 on his or her user client device 100, and is waiting for the provider vehicle 610.

The meeting point 616 is a discrete point where the provider can expect to find the user at or near the destination. The meeting point 616 is generally chosen by the user 616. Alternatively, the provider may set the location of the meeting point 616. For example, if the provider vehicle 610 arrives at the destination before the user 614.

The field of view 620 is an example field of view of a view 316 from capture point B 608. The arrow in the field of view 620 signifies the center of the field of view 620.

Alternate Embodiments

In an alternate embodiment, multiple views 316 from multiple capture points may be displayed to the provider on the provider client device 102. For example, in the embodiment of FIG. 6, the provider vehicle 610 may cross a first threshold (not shown), after which, the provider client device 102 displays a marker in a view 324 from capture point B 608. As the provider vehicle 610 continues towards the destination indicator 410, it may cross a second threshold (e.g., threshold 612), the second threshold being closer to (or farther from) the destination than the first threshold. After the provider client device 102 crosses the second threshold, the provider client device 102 may display a second marker in a view 324 from capture point A 606. This process could repeat any number of times for any number of capture points.

Practically, this embodiment may be done by the user 614 placing a marker in multiple views 316, each marker representing the same meeting point from a different capture point. For example, steps 316-328 from FIG. 3 may cyclically repeat any number of times. Alternatively, the user may only need to place a first marker in a first view 316 and the rendezvous coordination system 104 may automatically place other markers in other views 316 based upon the placement of the first marker. This may be done by determining the geographical location of the first marker based upon its placement in the first view 316.

In an alternate embodiment, the rendezvous coordination system 104 may automatically determine the meeting point by placing the marker in the view 316. This may be done by the rendezvous coordination system 104 using the location of the user client device 100 and the location of the capture point or multiple capture points.

In an alternate embodiment, if the rendezvous coordination system 104 does not have views 316 in the view database 200 associated with a capture point, or no capture points are near the destination, or the existing capture points are inadequate to display the meeting point, the user may use a view 316 captured by his or her user client device 100. For example, the user may capture a panoramic image using an image capture device on his or her user client device 100. He or she could then designate the meeting point by placing a marker in the captured panoramic image.

In an alternate embodiment, if the provider arrives at the destination before the user, the provider may have the option to select the meeting point by placing a marker in a view 316. The marker in the view 324 would then be sent to the user client device 100 and displayed to the user. This may help the user find the provider, upon approach to the destination.

In an alternate embodiment, the rendezvous coordination system 104 may give the provider the option to select a point by placing a marker in a view 316, the point indicating where the provider is waiting for the user. The marker in the view 316 would then be sent to the user client device 100.

Example Physical Components of a Computer

Figure 7:
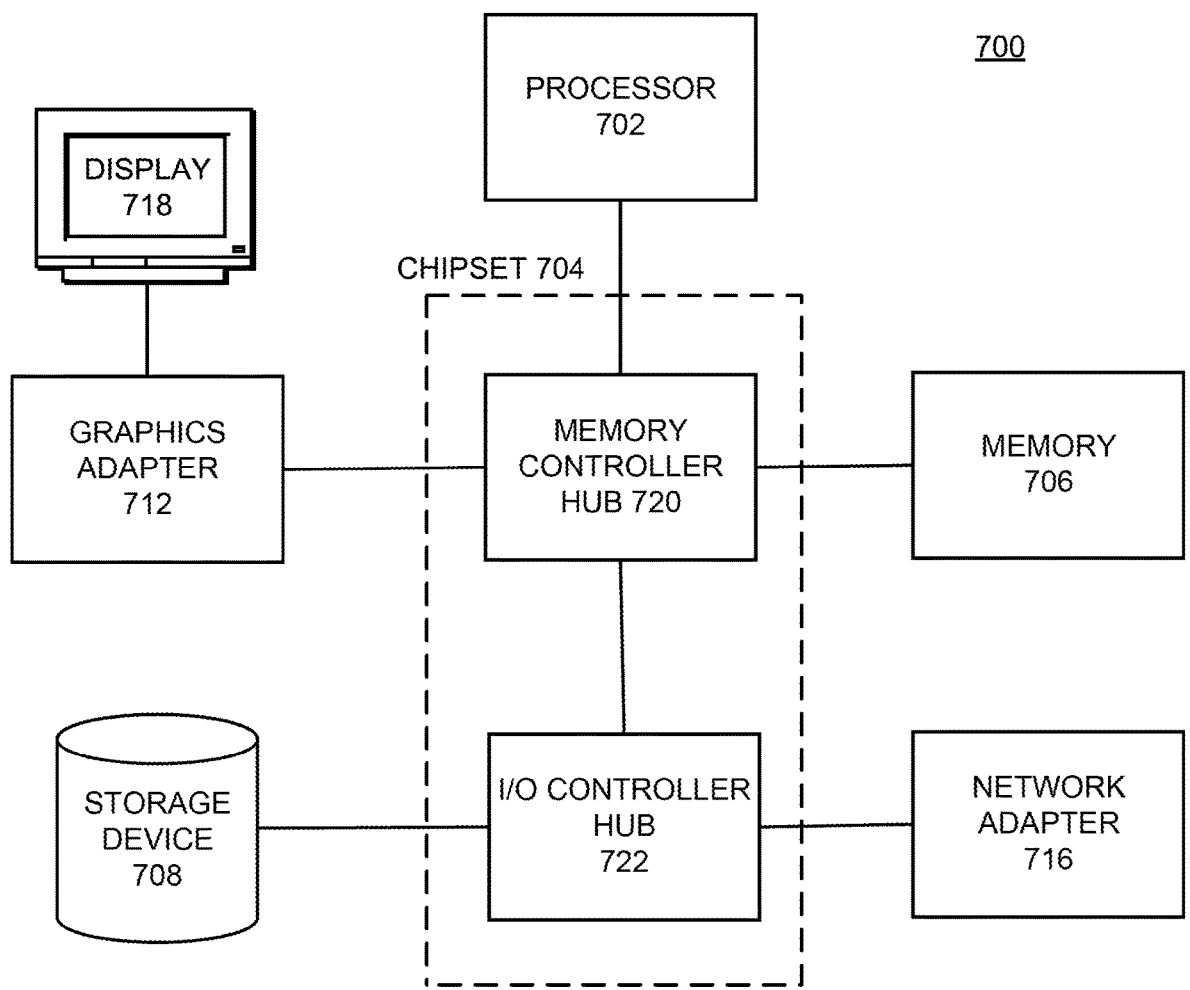
FIG. 7 is a high-level block diagram illustrating physical components of a computer used as part or all of the components from FIG. 1, according to one embodiment.

FIG. 7 is a high-level block diagram illustrating physical components of a computer 700 used as part or all of the components from FIG. 1 (e.g., the network system 100 or client devices 110), according to one embodiment. Illustrated are at least one processor 702 coupled to a chipset 704. Also coupled to the chipset 704 are a memory 706, a storage device 708, a graphics adapter 712, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is any non-transitory computer-readable storage medium, such as a hard drive, compact disk read-only memory (CD-ROM), DVD, or a solid-state memory device. The memory 706 holds instructions and data used by the processor 702. The graphics adapter 712 displays images and other information on the display 718. The network adapter 716 couples the computer 700 to a local or wide area network.

As is known in the art, a computer 700 can have different and/or other components than those shown in FIG. 7. In addition, the computer 700 can lack certain illustrated components. In one embodiment, a computer 700 such as a server or smartphone may lack a graphics adapter 712, and/or display 718, as well as a keyboard or pointing device. Moreover, the storage device 708 can be local and/or remote from the computer 700, e.g., embodied within a storage area network (SAN).

As is known in the art, the computer 700 is adapted to execute computer program modules or engines for providing functionality described herein. As used herein, the terms "module" or "engine" refer to computer program logic utilized to provide the specified functionality. Thus, a module and/or engine can be implemented in hardware, firmware, and/or software. In one embodiment, program modules and/or engines are stored on the storage device 708, loaded into the memory 706, and executed by the processor 702.

Additional Configurations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, by a provider client device, a route for a provider to travel to a destination;
receiving, by the provider client device, a view of an environment as depicted from an image capture point within a first threshold distance of the destination of the route, wherein the view of the environment was previously captured by an imaging device at the image capture point, the view of the environment including a marker representing a meeting point for a user;
monitoring, by the provider client device, traversal of the route to the destination to determine a location of the provider client device;
responsive to determining that the provider client device is within a second threshold distance of the image capture point based on the location of the provider client device, displaying, on the provider client device, the view of the environment including the marker representing the meeting point for the user and
displaying a second view of the environment that was previously captured at a second image capture point.

2. The method of claim 1, wherein prior to displaying the view of the environment the provider client device displays navigation information for the route.

3. The method of claim 1, wherein the marker is an overlay on the view of the environment.

4. The method of claim 1, wherein the second view of the environment is displayed by the provider client device before the provider client device is within the second threshold distance of the image capture point, the second view of the environment including a second marker representing the meeting point for the user.

5. The method of claim 4, wherein the second view of the environment is displayed when the provider client device is within a third threshold distance of the second image capture point.

6. The method of claim 1, wherein view of the environment including the marker representing the meeting point for the user is designated by the user on a user client device.

7. The method of claim 1, wherein the view of the environment including the marker representing the meeting point for the user is designated by a rendezvous coordination system.

8. The method of claim 1, wherein the view of the environment is a portion of a panoramic view of the environment captured at the image capture point.

9. The method of claim 1, wherein the view of the environment is captured by a user client device operated by the user.

10. The method of claim 1, wherein the meeting point is a location where a provider associated with the provider client device can expect to find the user.

11. A non-transitory computer readable medium associated with a provider client device and storing instructions that when executed by a processor cause the processor to:
receive a route for a provider to travel to a destination;
receive a view of an environment as depicted from an image capture point within a first threshold distance of the destination of the route, wherein the view of the environment was previously captured by an imaging device at the image capture point, the view of the environment including a marker representing a meeting point for a user;
monitor traversal of the route to the destination to determine a location of the provider client device;
responsive to determining that the provider client device is within a second threshold distance of the image capture point based on the location of the provider client device, display, on the provider client device, the view of the environment including the marker representing the meeting point for the user and
displaying a second view of the environment that was previously captured at a second image capture point.

12. The non-transitory computer-readable medium of claim 11, wherein prior to displaying the view of the environment the provider client device displays navigation information for the route.

13. The non-transitory computer-readable medium of claim 11, wherein the marker is an overlay on the view of the environment.

14. The non-transitory computer-readable medium of claim 11, wherein the second view of the environment is displayed by the provider client device from a second image capture point before the provider client device is within the second threshold distance of the image capture point, the second view of the environment including a second marker representing the meeting point for the user.

15. The non-transitory computer-readable medium of claim 14, wherein the second view of the environment is displayed when the provider client device is within a third threshold distance of the second image capture point.

16. The non-transitory computer-readable medium of claim 11, wherein view of the environment including the marker representing the meeting point for the user is designated by the user on a user client device.

17. The non-transitory computer-readable medium of claim 11, wherein the view of the environment including the marker representing the meeting point for the user is designated by a rendezvous coordination system.

18. The non-transitory computer-readable medium of claim 11, wherein the view of the environment is a portion of a panoramic view of the environment captured at the image capture point.

19. The non-transitory computer-readable medium of claim 11, wherein the view of the environment is captured by a user client device operated by the user.

20. A provider client device comprising:
one or more processors; and
a computer-readable storage medium comprising executable computer program code, the computer program code when executed causing the one or more processors to perform operations including:
receive a route for a provider to travel to a destination;
receive a view of an environment as depicted from an image capture point within a first threshold distance of the destination of the route, wherein the view of the environment was previously captured by an imaging device at the image capture point, the view of the environment including a marker representing a meeting point for a user;
monitor traversal of the route to the destination to determine a location of the provider client device;
responsive to determining that the provider client device is within a second threshold distance of the image capture point based on the location of the provider client device, display on the provider client device the view of the environment including the marker representing the meeting point for the user and
displaying a second view of the environment that was previously captured at a second image capture point.

21. The provider client device of claim 20, wherein the marker is an overlay on the view of the environment.

* * * * *

UNITED STATES PATENT AND TRADEMARK OFFICE
CERTIFICATE OF CORRECTION

PATENT NO. : 11,067,410 B2  Page 1 of 1
APPLICATION NO. : 15/698550
DATED : July 20, 2021
INVENTOR(S) : Seung Woo Lee It is certified that error appears in the above-identified patent and that said Letters Patent is hereby corrected as shown below:

In the Claims

In Column 10, in Claim 1, Line 37, delete "user and" and insert -- user; and --, therefor.

In Column 10, in Claim 2, Line 41, after "environment" insert -- , --.

In Column 11, in Claim 11, Line 23, delete "user and" and insert -- user; and --, therefor.

In Column 11, in Claim 12, Line 28, after "environment" insert -- , --.

In Column 11, in Claim 14, Lines 35-36, after "client device" delete "from a second image capture point".

In Column 12, in Claim 20, Line 37, after "user" insert -- ; --.

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*